(12) United States Patent
Bae et al.

(10) Patent No.: US 8,902,778 B2
(45) Date of Patent: Dec. 2, 2014

(54) COMMUNICATION DEVICE FOR DETECTING COLLISION IN OPERATING FREQUENCY BAND AND ANOTHER FREQUENCY BAND, AND COMMUNICATION METHOD THEREOF

(75) Inventors: Chi Sung Bae, Yongin-si (KR); Hyo Sun Hwang, Seoul (KR); Young Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 13/587,964

(22) Filed: Aug. 17, 2012

(65) Prior Publication Data

US 2013/0077497 A1 Mar. 28, 2013

(30) Foreign Application Priority Data

Sep. 26, 2011 (KR) ........................ 10-2011-0096906

(51) Int. Cl.
| | |
|---|---|
| *H04L 1/00* | (2006.01) |
| *H04W 4/00* | (2009.01) |
| *H04J 3/16* | (2006.01) |
| *H04J 1/00* | (2006.01) |
| *H04B 15/00* | (2006.01) |
| *H04B 1/10* | (2006.01) |
| *H04W 88/06* | (2009.01) |
| *H04W 74/08* | (2009.01) |

(52) U.S. Cl.
CPC .......... *H04W 74/0858* (2013.01); *H04W 88/06* (2013.01); *H04W 74/0825* (2013.01)
USPC ........... 370/252; 370/329; 370/437; 370/464; 455/63.1; 375/346

(58) Field of Classification Search
CPC ... H04W 28/04; H04W 28/048; H04W 16/14; H04W 40/16; H04W 52/24; H04W 52/244; H04W 72/082; H04W 74/0808; H04W 74/0816; H04W 74/0825; H04W 74/0858; H04W 88/02; H04W 88/06; H04B 1/719; H04B 1/713; H04B 1/1036; H04B 1/1027; H04B 1/7103; H04B 7/0626; H04B 10/2507; H04B 15/00; H04B 17/005; H04B 17/0057; H04B 17/0042; H04B 17/0077; H04B 2001/7154; H04B 2001/1045; H04L 5/0037; H04L 5/0073; H04L 5/06; H04L 5/006; H04L 27/2647; H04L 1/20
USPC ........................ 375/219, 222, 260, 346–348; 455/59–63.1, 63.3, 67.11, 67.13, 455/114.2–115.3, 179.1; 370/229–238, 370/329, 332–333, 343, 241–252, 431–437, 370/447, 449, 464–465, 477, 480, 491
See application file for complete search history.

(56) References Cited

U.S. PATENT DOCUMENTS

| | | | |
|---|---|---|---|
| 6,922,551 B1 * | 7/2005 | Bristow et al. ................. | 455/103 |
| 7,342,973 B2 * | 3/2008 | Walker et al. ................. | 375/260 |

(Continued)

FOREIGN PATENT DOCUMENTS

| | | | |
|---|---|---|---|
| KR | 10-2010-0040592 A | | 4/2010 |
| WO | WO 2006/101489 A1 | | 9/2006 |

*Primary Examiner* — Tri H Phan
(74) *Attorney, Agent, or Firm* — NSIP Law

(57) ABSTRACT

A communication device for detecting a collision in an operating frequency band and another frequency band, and a communication method thereof. The communication method includes transmitting or receiving a packet using an operating frequency band. The communication method further includes detecting whether another communication device transmits another packet using another frequency band different from the operating frequency band while the transmitting or the receiving of the packet using the operating frequency band. The communication method further includes ceasing the transmitting or the receiving of the packet using the operating frequency band based on a result of the detection.

22 Claims, 12 Drawing Sheets

(56) References Cited

U.S. PATENT DOCUMENTS

| | | | |
|---|---|---|---|
| 8,345,808 B2* | 1/2013 | Ye et al. | 375/348 |
| 8,630,230 B2* | 1/2014 | Liu et al. | 370/328 |
| 2002/0061031 A1* | 5/2002 | Sugar et al. | 370/466 |
| 2003/0072295 A1* | 4/2003 | Maxemchuk | 370/348 |
| 2007/0217455 A1 | 9/2007 | Haeusler | |
| 2009/0219905 A1 | 9/2009 | Khandekar et al. | |
| 2010/0027483 A1* | 2/2010 | Ofuji et al. | 370/329 |
| 2010/0130222 A1* | 5/2010 | Claussen et al. | 455/452.2 |
| 2011/0134746 A1* | 6/2011 | Liu et al. | 370/201 |
| 2011/0299417 A1* | 12/2011 | Nanda et al. | 370/252 |
| 2012/0040676 A1* | 2/2012 | Jang et al. | 455/436 |
| 2013/0077497 A1* | 3/2013 | Bae et al. | 370/241 |

* cited by examiner

COMMUNICATION DEVICE FOR DETECTING COLLISION IN OPERATING FREQUENCY BAND AND ANOTHER FREQUENCY BAND, AND COMMUNICATION METHOD THEREOF

CROSS-REFERENCE TO RELATED APPLICATION(S)

This application claims the benefit under 35 U.S.C. §119(a) of Korean Patent Application No. 10-2011-0096906, filed on Sep. 26, 2011, in the Korean Intellectual Property Office, the entire disclosure of which is incorporated herein by reference for all purposes.

BACKGROUND

1. Field

The following description relates to a communication device for detecting a collision in an operating frequency band and another frequency band, and a communication method thereof.

2. Description of Related Art

A wireless sensor network may detect information about an object, a body, and an environment using various miniaturized sensors, and may store and process the detected information to be used to recognize and/or diagnose a condition. The wireless sensor network may assign a computing technology and a communication function to an object to form a network infrastructure.

A wireless sensor network has been used in an external environment for a service of monitoring conditions, such as, for example, a temperature, humidity, a vibration, and a power control. A wireless sensor network has also been used in various fields, such as, for example, a smart car service that delivers a control signal and monitoring information between main components of a car and a smart grid optimizing energy usage. Even further, a wireless sensor network has been used for application services, such as, for example, home automation and mobile health care, which enhance the convenience of a user by connecting multiple information devices, wireless sensors, electronic devices, and other types of devices around the user.

A wireless sensor network may include an IEEE 802.15 wireless personal area network (WPAN). The wireless sensor network may provide a long-term service using a limited amount of battery power, and thus, each layer of the wireless sensor network may be optimized to reduce power consumption. For example, a physical layer may be designed to include constraints on power consumption, and a media access control (MAC) layer and an application layer may minimize power consumption due to communication, through effective use of a transmission technology.

SUMMARY

In one general aspect, there is provided a communication method of a communication device, including transmitting or receiving a packet using an operating frequency band. The communication method further includes detecting whether another communication device transmits another packet using another frequency band different from the operating frequency band while the transmitting or the receiving of the packet using the operating frequency band. The communication method further includes ceasing the transmitting or receiving of the packet using the operating frequency band based on a result of the detection.

The communication method further includes setting the operating frequency band.

The ceasing includes blocking power from being applied to the transmitting or the receiving of the packet using the operating frequency band.

The detecting of whether the other communication device transmits the other packet using the other frequency band, is in conjunction with the transmitting or the receiving of the packet using the operating frequency band.

The communication method further includes sensing whether the operating frequency band is in an idle state.

The communication method further includes detecting whether the other communication device ceases transmitting the other packet using the other frequency band.

The communication method further includes retransmitting or re-receiving the packet using the operating frequency band based on whether the other communication device ceases transmitting the other packet using the other frequency band.

The retransmitting or re-receiving includes providing power to the retransmitting or re-receiving of the packet using the operating frequency band.

The detecting includes detecting a strength of a signal in the other frequency band. The detecting further includes detecting whether the other communication device transmits the other packet using the other frequency band based on whether the strength is greater than or equal to a predetermined threshold.

The other frequency band includes a narrow band adjacent to the operating frequency band, or a wide band including the operating frequency band.

A non-transitory computer-readable storage medium stores a program including instructions to cause a computer to perform the method.

In another general aspect, there is provided a communication device including a transceiver configured to transmit and receive a packet using an operating frequency band. The communication device further includes a detector configured to detect whether another communication device transmits another packet using another frequency band different from the operating frequency band while the transceiver transmits or receives the packet using the operating frequency band. The communication device further includes a controller configured to control the transceiver to cease transmitting or receiving the packet using the operating frequency band based on a result of the detection.

The communication device further includes a setting unit configured to set the operating frequency band.

The controller is further configured to block power from being applied to the transceiver to control the transceiver to cease transmitting or receiving the packet using the operating frequency band.

The detector is further configured to detect whether the other communication device transmits the other packet using the other frequency band, in conjunction with the transceiver transmitting or receiving the packet using the operating frequency band.

The communication device further includes a sensor configured to sense whether the operating frequency band is in an idle state.

The detector is configured to detect whether the other communication device ceases transmitting the other packet using the other frequency band.

The transceiver is further configured to retransmit or re-receive the packet using the operating frequency band based on whether the other communication device ceases transmitting the other packet using the other frequency band.

The controller is further configured to provide power to the transceiver to control the transceiver to retransmit or re-receive the packet using the operating frequency band.

The detector is further configured to detect a strength of a signal in the other frequency band. The detector is further configured to detect whether the other communication device transmits the other packet using the other frequency band based on whether the strength is greater than or equal to a predetermined threshold.

Other features and aspects may be apparent from the following detailed description, the drawings, and the claims.

Figure 1:
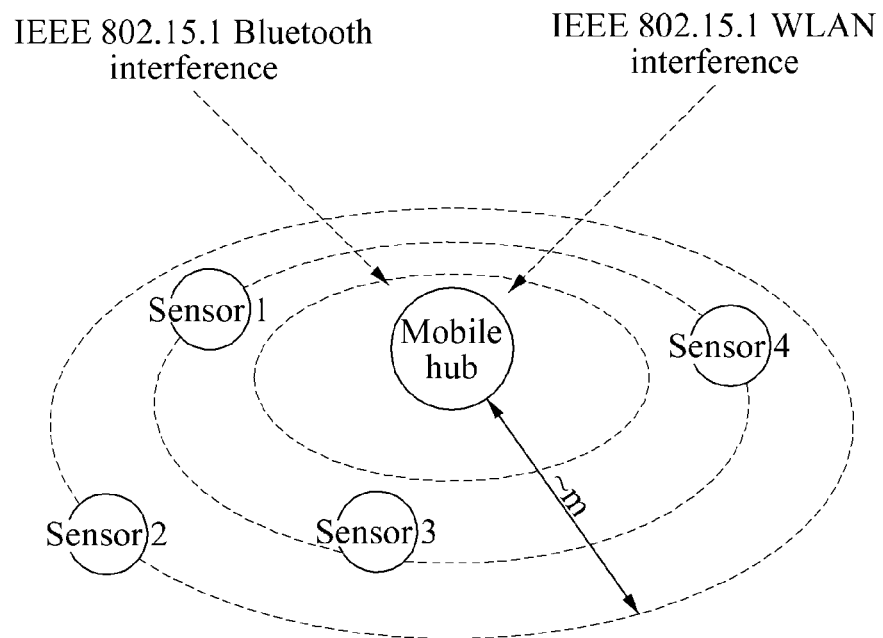
FIG. 1 is a diagram illustrating an example of a wireless personal area network (WPAN) including a mobile hub and sensor nodes.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a wireless personal area network (WPAN) including a mobile hub and sensor nodes. The WPAN may wirelessly connect and support limitless communication between devices, such as, for example, a computer, a peripheral device, a sensor, a mobile communication device, a home appliance, and/or other types of devices, which are located within a relatively short distance of about several meters (m) from the mobile hub. Accordingly, the WPAN may provide various services.

A WPAN protocol may be designed with the aim of utilizing low power, a short distance, microminiaturization, and a low price. The WPAN protocol may use unique physical layer (PHY) and media access control (MAC) technology, and may include, for example, Zigbee, Bluetooth, wireless body area network (WBAN), ANT+, and/or other types of protocols that satisfy service requirements of various application programs.

A low power wireless communication device may interfere, relatively weakly, with other communication devices. Thus, the low power wireless communication device may operate using a common frequency band, such as, for example, an industrial, scientific and medical (ISM) band, rather than receiving an assignment of a predetermined frequency band. The low power wireless communication device may be constructed to have relatively high reception sensitivity and relatively low transmission power, to minimize power consumption, and thus, may relatively slightly affect communication quality of other communication devices.

However, signals of other communication devices may significantly affect communication quality of the low power wireless communication device. Accordingly, a scheme of resolving such interference may be used when a near field communication protocol of the low power wireless communication device operates in the common frequency band that allows a simultaneous operation of different protocols.

Referring to FIG. 1, the mobile hub corresponds to "Mobile hub", and the sensor nodes correspond to Sensors 1 through 4. The mobile hub and the sensor nodes operate using a common frequency band, such as, for example, the ISM band, and receive interference from a signal of another protocol, such as, for example, Zigbee, Bluetooth and wireless local area network (WLAN), and/or other types of protocols. For example, the mobile hub and the sensor nodes may have a communication range limited to within several meters due to a relatively low maximum transmission power, and may be similarly affected by an external interference signal in terms of a bit error rate (BER) and a packet error rate (PER).

When an idle frequency is included in the common frequency band, moving an operating channel of the WPAN into the idle frequency of the common frequency band, may be an effective scheme to avoid a collision due to interference. However, when at least three WLAN access points (APs) use a wideband protocol and the common frequency band, locating the idle frequency to be used by the WPAN, may be difficult. Thus, it may be difficult for the WPAN using the common frequency band to avoid the wideband protocol (e.g., a WLAN and/or an ultra wideband (UWB)) using the same frequency band. Accordingly, in examples, a collision due to an interference signal in the common frequency band during transmission and/or reception, is detected based on a different frequency band of a signal between a WPAN communication device using a narrow band and another communication device using a wide band.

Figure 2:
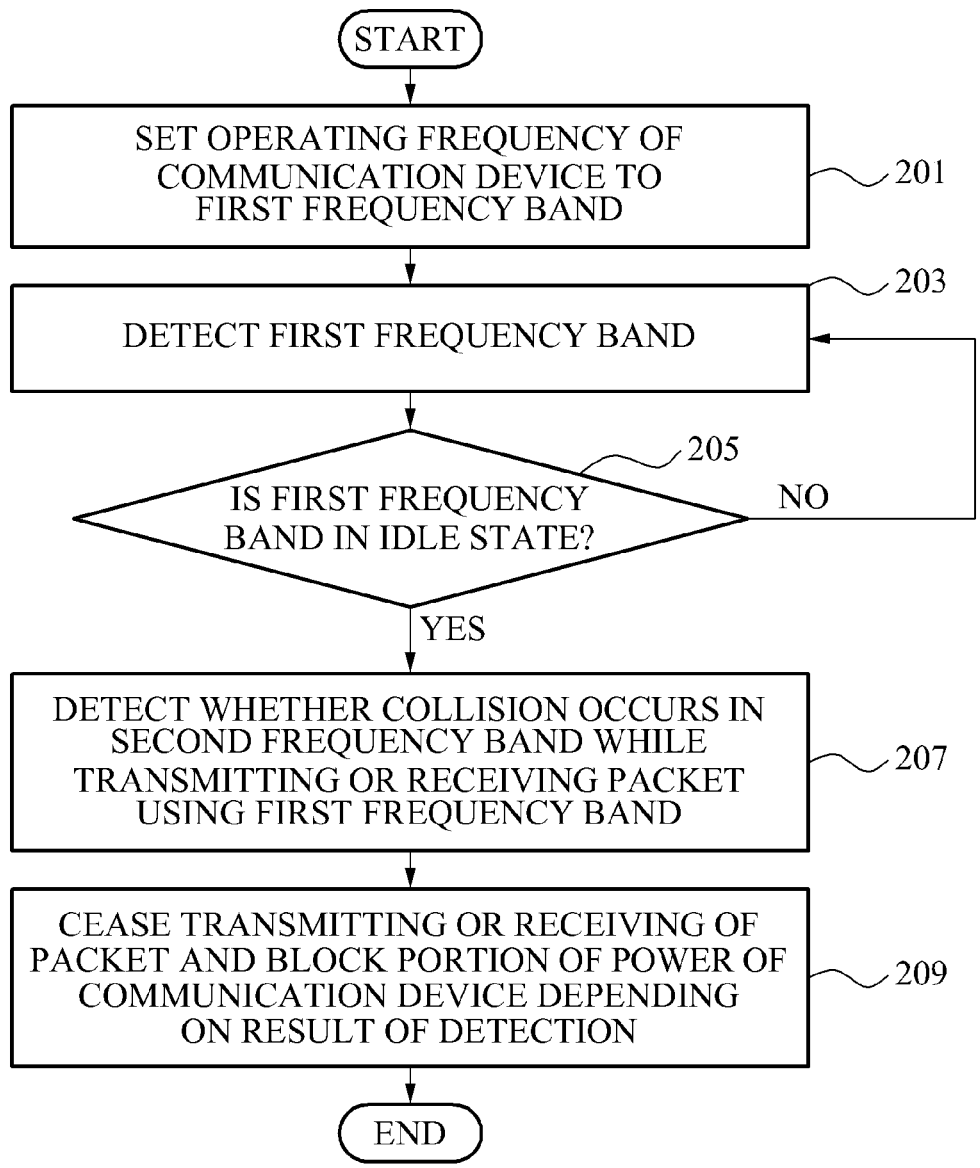
FIG. 2 is a flowchart illustrating an example of an operation of detecting a collision in a communication device.

FIG. 2 illustrates an example of an operation of detecting a collision in a communication device. At operation 201, the communication device sets an operating frequency of the communication device to a first frequency band. For example, the communication device may include a mobile hub, a sensor node, and/or a narrowband terminal that operates using a narrow band of a WPAN.

At operation 203, the communication device detects the first frequency band. At operation 205, the communication device detects whether the first frequency band is in an idle state. If the first frequency band is in the idle state, the operation continues at operation 207. Otherwise, the operation returns to operation 203.

At operation 207, the communication device detects whether a collision (e.g., an interference signal) occurs between the communication device and another transmission device in a second frequency band different from the first frequency band while transmitting or receiving a packet using the first frequency band. The second frequency band may refer to a narrow band adjacent to the first frequency band, or to a wide band including the first frequency band.

At operation 209, the communication device ceases the transmission or reception of the packet, and blocks a portion of power of the communication device, depending on a result of the detection in operation 207. In this example, the communication device may perform the blocking of the portion of power after or during the ceasing of the transmission or reception of the packet. The blocking of the portion of the power may include blocking power applied to a transmitter of the communication device while transmitting the packet, and/or blocking power applied to a receiver of the communication device while receiving the packet.

In examples, the communication device may detect whether the collision between the communication device and another transmission device occurring in the second frequency band is resolved. The communication device may retransmit and/or re-receive the packet using the first frequency band, while providing the portion of the power of the communication device based on whether the collision is resolved.

Figure 3:
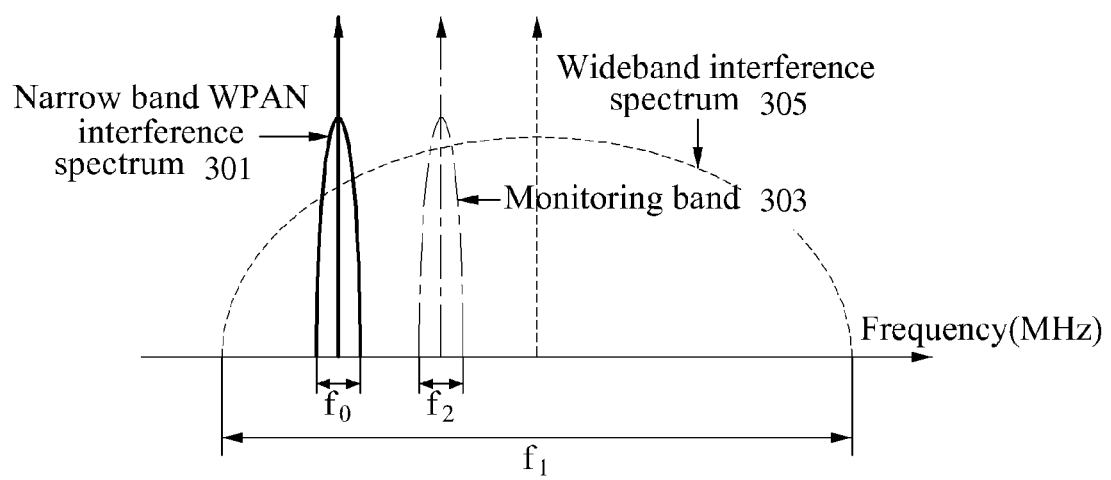
FIG. 3 is a diagram illustrating an example of a spectrum in which communication devices operate in a frequency domain where a wideband overlaps with a narrowband.

FIG. 3 illustrates an example of a spectrum in which communication devices operate in a frequency domain where a wideband overlaps with a narrowband. A narrowband communication device operates in the narrow band of a WPAN, e.g., in a frequency band $f_0$ 301, and a wideband communication device operates in the wide band, e.g., in a frequency band $f_1$ 305. The frequency bands $f_0$ 301 and $f_1$ 305 correspond to interference spectrums 301 and 305, respectively.

The frequency band $f_0$ overlaps with the frequency band $f_1$. Thus, when the wideband communication device transmits a signal while the narrowband communication device is transmitting and/or receiving another signal, the other signal of the narrowband communication device receives interference in all frequencies of the wide band, and thus, a wireless transmission and/or reception may fail.

Accordingly, the narrowband communication device may wait for an acknowledgement (ACK) or a negative acknowledgement (NACK) transmitted from a communication device that the narrowband communication device is communicating with, and/or may retransmit a packet. In this example, an amount of power of the narrowband communication device may be wasted due to a time interval of waiting for the ACK message or the NACK message, and/or retransmitting the packet.

A wireless communication protocol may not monitor a channel condition in a frequency band that includes a frequency of transmission and/or reception due to a structure of a wireless communication transceiver. However, as described in the foregoing, when a wideband signal interferes with a narrowband signal, whether an interference signal is received in the narrowband signal may be determined even though a frequency band being monitored does not include a transmission and reception frequency of the narrowband signal. Accordingly, a collision at the transmission and reception frequency may be detected by monitoring a frequency different than the transmission and reception frequency.

For example, while the narrowband communication device transmits the narrowband signal in the frequency band $f_0$ 301, an additional wideband receiver monitors for an interference signal in a frequency band $f_2$ 303 (e.g., a monitoring band). The wideband receiver detects a collision when an interference signal is received in the frequency band $f_2$ 303.

Accordingly, a collision occurring while transmitting and/or receiving a signal, is detected according to a scheme described in the foregoing. Using the scheme, the collision is detected even when a frequency of the transmission and/or reception signal is not monitored.

For example, the mobile hub of FIG. 1 may include a multi-function communication device, such as a smartphone. Thus, the mobile hub may include both a narrowband transceiver and a wideband transceiver. Accordingly, the mobile hub may detect a collision of a radio signal by monitoring the frequency band $f_1$ 305 using the wideband transceiver, while the narrowband transceiver operates in the frequency band $f_0$ 301.

However, the sensor node of FIG. 1 may include only a narrowband transceiver (e.g., a narrowband transmitter and a narrowband receiver) since the sensor node may operate in a low power mode. Thus, in this example, the sensor node may detect interference due to a wideband signal by monitoring the frequency band $f_2$ 303 using the narrowband receiver, while the narrowband transmitter transmits a narrowband signal in the frequency band $f_0$ 301. However, the narrowband receiver may receive another narrowband signal in the frequency band $f_2$ 303, and may determine that a collision occurs when no collision occurs.

Thus, to determine whether a collision occurs, the sensor node may use a scheme described in the foregoing when it is determined that a wideband protocol operating in a frequency of the sensor node is present, and that a signal is frequently transmitted and/or received in a corresponding frequency domain. When the narrowband sensor nodes operate in areas close to one another and thus include similar interference environments, the mobile hub may determine whether a wideband protocol operates in the same frequency band as the sensor nodes, and may inform each sensor node about whether a collision occurs in advance.

Figure 4:
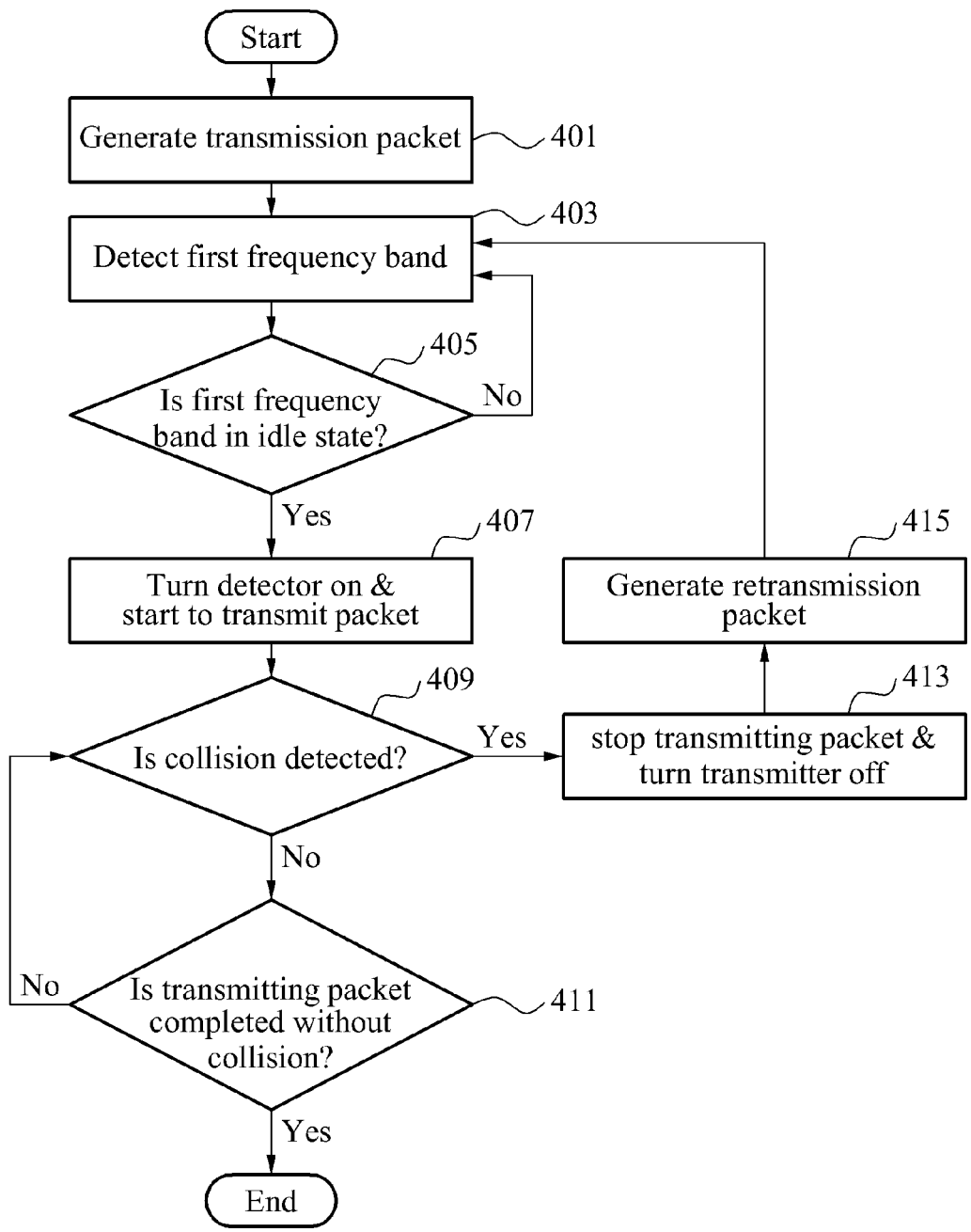
FIG. 4 is a flowchart illustrating an example of an operation of transmitting a packet in a communication device.

FIG. 4 illustrates an example of an operation of transmitting a packet in a communication device. An operating frequency band of the communication device corresponds to a first frequency band. A different frequency band used to monitor whether a collision occurs between the communication device and another communication device, corresponds to a second frequency band. The second frequency band may refer to a narrow band adjacent to the first frequency band, or to a wide band including the first frequency band.

At operation 401, the communication device generates a packet to be transmitted, e.g., a transmission packet. At operation 403, the communication device detects the first frequency band of the transmission packet. At operation 405, the communication device determines whether the first frequency band is in an idle state. If the first frequency band is in the idle state, the operation continues at operation 407. Otherwise, the operation returns to operation 403. That is, the communication device may continuously determine whether the first frequency band is in the idle state until the first frequency band is in the idle state.

At operation 407, the communication device turns on a detector included in the communication device and configured to detect the second frequency band, or applies power to the detector, and starts to transmit the packet. Thus, the communication device may detect whether a collision, that is, an interference signal, occurs in the second frequency band, while transmitting the packet.

At operation 409, the communication device determines whether a collision is detected in the second frequency band. If a collision is not detected, the operation continues in operation 411. Otherwise, the operation continues in operation 413.

At operation 411, the communication device determines whether the transmitting of the packet is completed without a collision. If the transmitting of the packet is properly completed without a collision, the operation ends. Otherwise, the operation returns to operation 409.

At operation 413, the communication device stops or immediately ceases the transmitting of the packet, and turns off a transmitter included in the communication device, or stops applying power to the transmitter. For example, the communication device may cease the transmitting of the packet in conjunction with the turning off of the transmitter. At operation 415, the communication device generates a retransmission packet, and the operation returns to operation 403.

Figure 5:
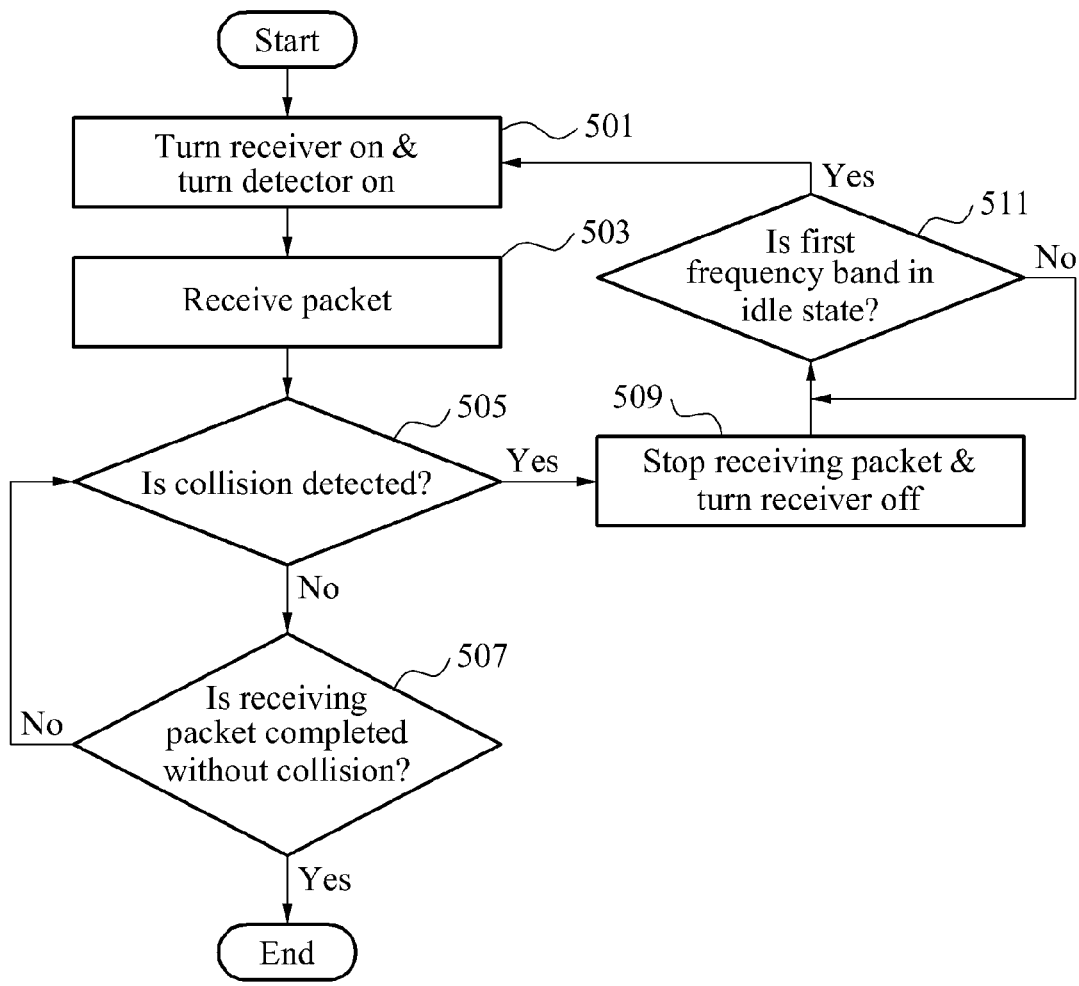
FIG. 5 is a flowchart illustrating an example of an operation of receiving a packet in a communication device.

FIG. 5 illustrates an example of an operation of receiving a packet in a communication device. An operating frequency band of the communication device corresponds to a first frequency band. A different frequency band used to monitor whether a collision occurs between the communication device and another communication device, corresponds to a second frequency band. The second frequency band may refer to a narrow band adjacent to the first frequency band, or to a wide band including the first frequency band.

At operation 501, the communication device simultaneously turns on a receiver and a detector that are included in the communication device, or simultaneously applies power to the receiver and the detector. At operation 503, the communication device receives a packet through the receiver.

At operation 505, the communication device determines whether a collision (e.g., an interference signal) is detected in the second frequency band through the detector. If a collision is not detected, the operation continues in operation 507. Otherwise, the operation continues in operation 509.

At operation 507, the communication device determines whether the receiving of the packet is completed without a collision. If the receiving of the packet is properly completed without a collision, the operation ends. Otherwise, the operation returns to operation 505.

At operation 509, the communication device stops or immediately ceases the receiving of the packet, and turns off the receiver, or stops applying power to the receiver. At operation 511, the communication device determines whether the first frequency band is in an idle state. If the first frequency band is not in the idle state, the operation returns to operation 509. Otherwise, the operation returns to operation 501.

Figure 6:
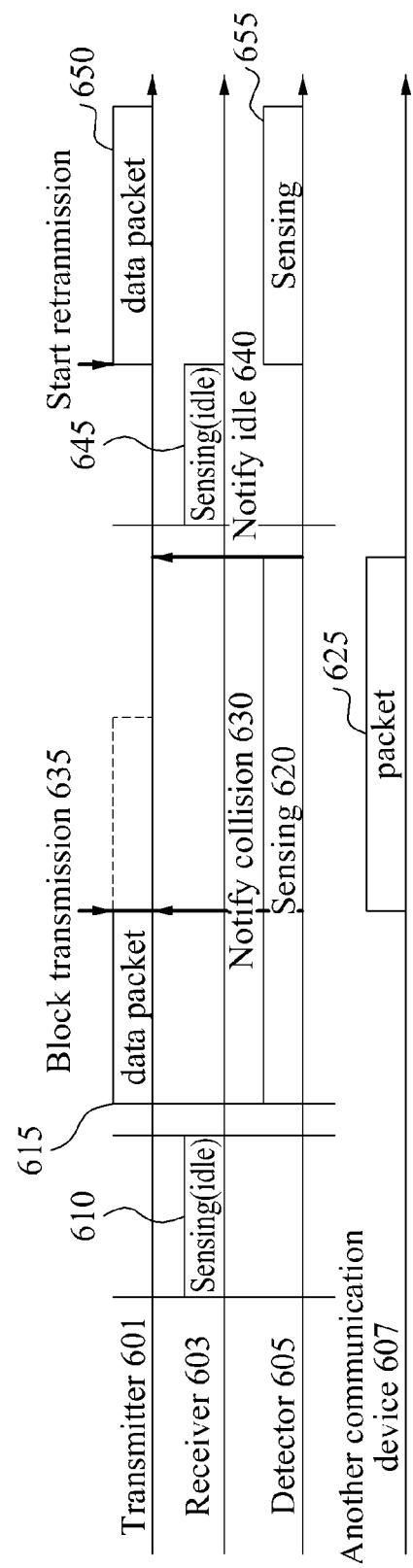
FIG. 6 is a diagram illustrating an example of an operation of retransmitting a packet after detecting a collision in a communication device.

FIG. 6 illustrates an example of an operation of retransmitting a packet after detecting a collision in a communication device. The communication device includes a transmitter 601, a receiver 603, and a detector 605. Another communication device 607 generates a collision with the communication device by using a frequency band of the communication device or by transmitting a data packet in the frequency band of the communication device.

In operation 610, the receiver 603 senses or determines whether a first frequency band, corresponding to an operating frequency band of the communication device, is in an idle state. In operation 615, the transmitter 601 transmits a data packet using the first frequency band based on a result of the detection of the receiver 603. In operation 620, the detector 605 senses or detects for interference in a second frequency band different from the first frequency band. The second frequency band may refer to a narrow band adjacent to the first frequency band, or to a wide band including the first frequency band.

In operation 625, the other communication device 607 transmits another data packet simultaneously with the transmitter 601 transmitting the initial data packet in operation 615. In operation 630, the detector 605 notifies or informs the communication device (e.g., a controller of the communication device) that a collision (e.g., the interfering data packet of the other communication device 607) occurs in the second frequency band.

In operation 635, in response to the collision being detected, the transmitter 601 blocks or ceases the transmission of the data packet. Thereafter, the detector 605 may determine or verify whether the collision is resolved by continuously monitoring for interference in the second frequency band.

In operation 640, in response to the other communication device 607 terminating the transmission of the other data packet, the detector 605 notifies or informs the communication device that the collision is resolved or idle. In operation 645, the receiver 603 senses or determines whether the first frequency band is in the idle state.

In operation 650, in response to the receiver 603 determining that the first frequency band is in the idle state, the communication device provides power to the transmitter 601 to start retransmission of the data packet. In operation 655, simultaneously, the communication device continuously causes the detector 605 to sense or detect for interference in the second frequency band.

Figure 7:
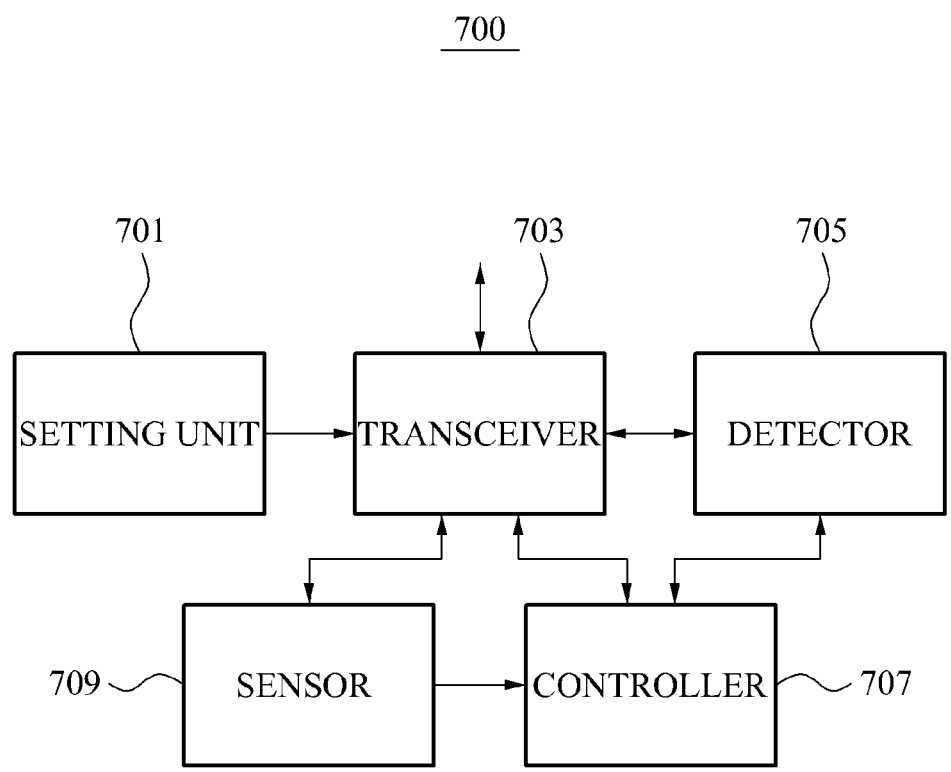
FIG. 7 is a block diagram illustrating an example of a communication device.

FIG. 7 illustrates an example of a communication device 700. The communication device 700 includes a setting unit 701, a transceiver 703, a detector 705, a controller 707, and a sensor 709.

The setting unit 701 sets an operating frequency of the communication device 700 to a first frequency band. The transceiver 703 transmits and/or receives a packet using the first frequency band.

The detector 705 detects whether a collision (e.g., an interference signal) occurs between the communication device 700 and another communication device in a second frequency band different from the first frequency band, while the transceiver 703 transmits and/or receives the packet using the first frequency band. That is, the detector 705 detects whether a collision occurs between the communication device 700 and the other communication device in conjunction with the transceiver 703 transmitting and/or receiving the packet using the first frequency band.

The detector 705 detects whether a collision occurs between the communication device 700 and the other communication device based on whether a strength of the interference signal detected in the second frequency band is greater than or equal to a predetermined threshold. The detector 705 further detects whether the collision that occurs between the communication device 700 and the other communication device in the second frequency band, is resolved.

The controller 707 controls the transceiver 703 based on whether the collision is detected. For example, the controller 707 controls the transceiver 703 to cease transmission and/or reception of the packet if the collision is detected. To do this, in examples, the controller 707 may block power of the communication device 700 from being provided to the transceiver 703.

Further, the controller 707 controls the transceiver 703 based on whether the collision is resolved. For example, the controller 707 controls the transceiver 703 to retransmit and/or re-receive the packet if the collision is resolved. To do this, in examples, the controller 707 may provide the power of the communication device 700 to the transceiver 703.

The transceiver 703 retransmits and/or re-receives the packet using the first frequency band, while the controller 707 provides, to the transceiver 703, the power of the communication device 700 based on whether the collision is resolved. That is, the transceiver 703 retransmits and/or re-receives the packet using the first frequency band in conjunction with the controller 707 providing, to the transceiver 703, the power of the communication device 700 based on whether the collision is resolved. The sensor 709 senses whether the first frequency band is in an idle state.

Figure 8:
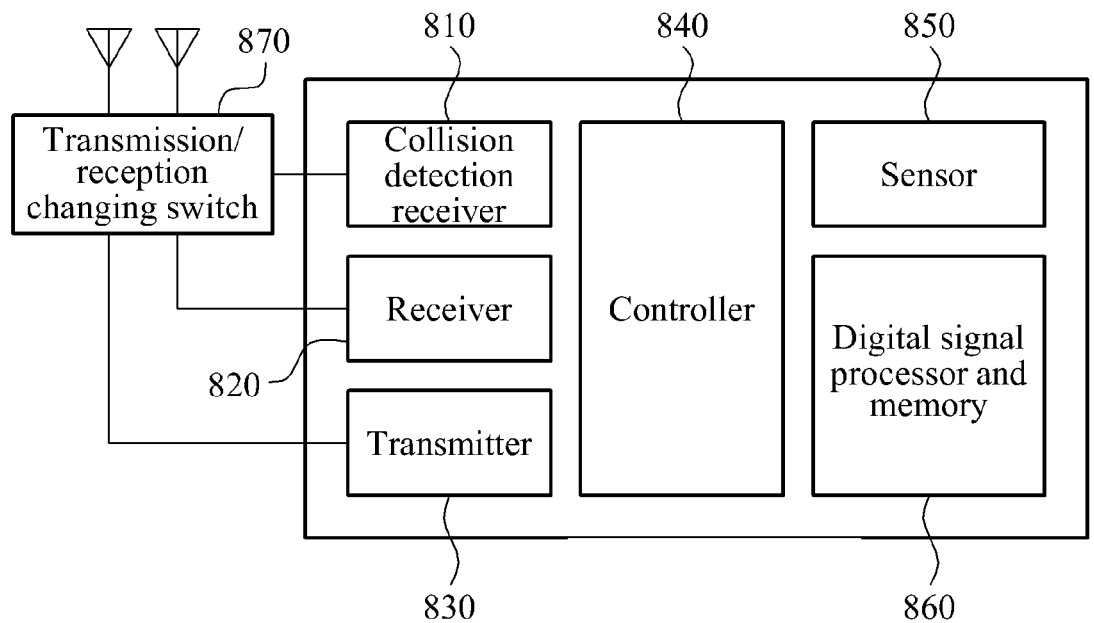
FIG. 8 is a diagram illustrating another example of a communication device.

FIG. 8 illustrates another example of a communication device. The communication device includes a collision detection receiver 810, a receiver 820, a transmitter 830, a controller 840, a sensor 850, a digital signal processor and memory 860, and a transmission/reception changing switch 870.

The sensor 850 senses an environmental condition, such as, for example, a temperature, humidity, acceleration, an electrocardiography (ECG), and/or an electromyography (EMG). The digital signal processor and memory 860 stores, integrates, and processes the environmental condition sensed by the sensor 850.

The receiver 820 and the transmitter 830 may correspond to a WPAN transceiver that operates in a first frequency band. The collision detection receiver 810 detects a collision (e.g., an interference signal) that occurs between the communication device and another communication device in a second frequency band different from the first frequency band. The collision detection receiver 810 may be embodied in various forms, such as, for example, an energy detection receiver, a WPAN receiver, a wideband (e.g., WLAN) receiver, and/or other types of receivers.

The mobile hub of FIG. 1 may include both a wideband transceiver and a narrowband transceiver. Thus, in this example, a wideband receiver having an antenna that receives a signal in a frequency band different from the first frequency band of the communication device, may be used as the collision detection receiver 810.

The sensor node of FIG. 1 may exclude at least one of a wideband transceiver and a narrowband transceiver. Thus, in this example, a WPAN receiver, e.g., the receiver 820, may be used as the collision detection receiver 810 to monitor for interference in an adjacent frequency band.

The controller 840 controls an operation of the collision detection receiver 810, the receiver 820, and the transmitter 830, and detects the collision based on a signal received from the collision detection receiver 810 while the receiver 820 and the transmitter 830 operate. The controller 840 blocks power of the communication device from being provided to the receiver 820 and/or the transmitter 830 in response to the collision being detected. That is, in response to a collision being detected, the controller 840 blocks the power from being provided to the receiver 820 and/or the transmitter 830 to prevent the power from being expended. The transmission/reception changing switch 870 transmits and/or receives signals from other communication devices and forwards them to the collision detection receiver 810, the receiver 820, and/or the transmitter 830 based on respective frequencies of the signals, e.g., whether the signals are in the first frequency band, the second frequency band, etc.

Aspects described with reference to FIG. 9 through FIG. 12 involve an operation of detecting WLAN interference in a WPAN communication device where a WLAN protocol and a WPAN protocol operate in the same frequency band, e.g., an industrial, scientific and medical (ISM) band. FIGS. 9 through 12 further involve an operation of retransmitting a packet after detecting the WLAN interference.

Figure 9:
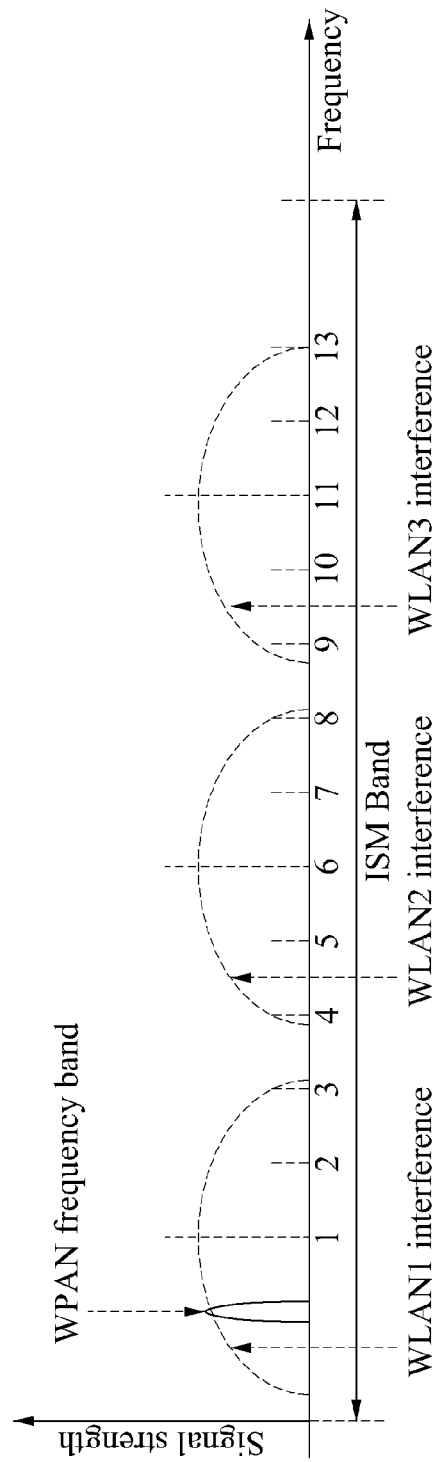
FIG. 9 is a diagram illustrating an example of a spectrum in an environment where a WPAN signal and a wireless local area network (WLAN) signal coexist in an industrial, scientific and medical (ISM) band.

FIG. 9 illustrates an example of a spectrum in an environment where a WPAN signal and a WLAN signal coexist in an ISM band. Referring to FIG. 9, a communication device (e.g., a mobile hub) includes both a WLAN transceiver and a WPAN transceiver. The communication device transmits and receives data using the WPAN transceiver, and detects a collision by monitoring for an interference signal using a WLAN receiver as a detector. For example, the communication device detects whether a collision with a wideband WLAN1 frequency band (e.g., a WLAN1 interference) occurs using the wideband WLAN receiver, when the communication device transmits and receives a signal in a narrowband WPAN frequency band. The ISM band further includes a wideband WLAN2 frequency band and a wideband WLAN3 frequency band, e.g., a WLAN2 interference and a WLAN3 interference, respectively.

In more detail, the communication device turns on the WLAN receiver to scan a frequency band of an overall ISM band and to detect a collision. The communication device sets an operating frequency band of the WLAN receiver to be the WLAN1 frequency band that may interfere with the WPAN frequency band. The communication device detects an occurrence of a collision with another communication device when the WLAN receiver receives the WLAN signal having a strength or an amplitude greater than or equal to a predetermined threshold while the communication device exchanges the WPAN signal with one or more communication devices. To detect the WLAN signal having an amplitude greater than or equal to a predetermined threshold, the WLAN receiver may measure an amplitude of a received signal using a training sequence of a WLAN, or may measure an amplitude of the received signal using a pilot channel allocated to, for example, −21, −7, 7, and 21 sub-carriers of the WLAN.

Figure 10:
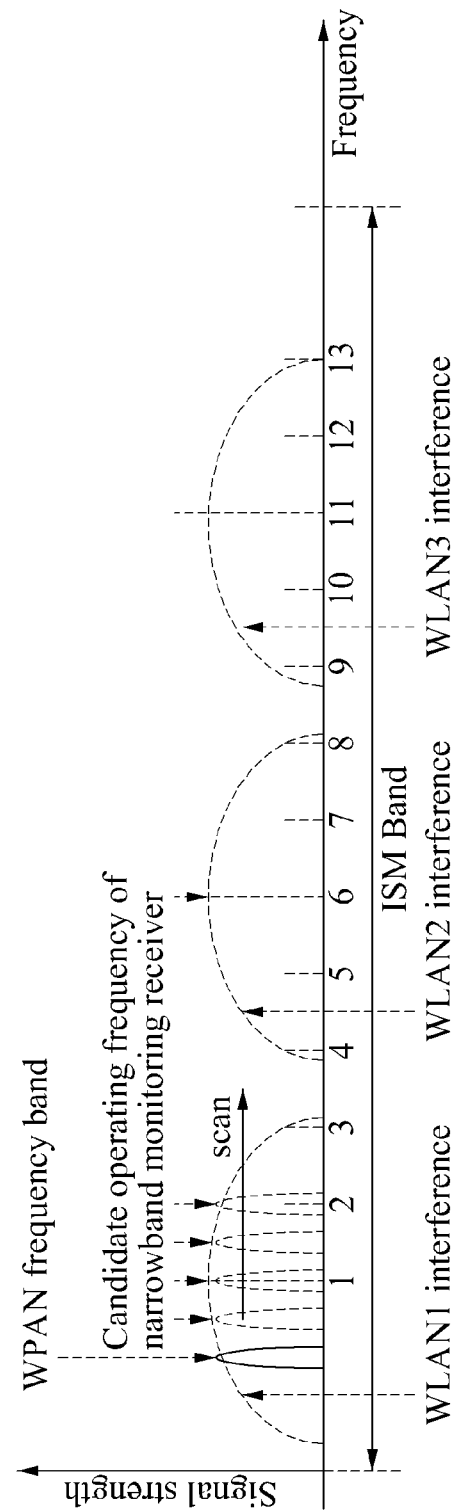
FIG. 10 is a diagram illustrating an example of a spectrum in which a detector is used in a narrow band of an environment where a WPAN signal and a WLAN signal coexist in an ISM band.

FIG. 10 illustrates an example of a spectrum in which a detector is used in a narrow band of an environment where a WPAN signal and a WLAN signal coexist in an ISM band. Referring to FIG. 10, a communication device includes a narrowband transmitter and a narrowband monitoring receiver as a detector. The communication device detects a collision with a wideband (e.g., a WLAN frequency band) by transmitting and receiving data using the narrowband (e.g., a WPAN frequency band) transmitter and the narrowband monitoring receiver, respectively, and by monitoring for an interference signal using the narrowband monitoring receiver. The communication device sets a candidate operating frequency band of the narrowband monitoring receiver to detect a collision, and detects a collision when the WPAN signal and the WLAN signal coexist in the ISM band.

In more detail, the communication device turns on the narrowband receiver to scan an overall ISM band and to detect a collision. The communication device predicts an operating location or frequency band of a wideband interference signal using a result of the scan. For example, when a signal is received in a frequency band similar to a WLAN frequency band (e.g., a WLAN1 interference, a WLAN2 interference, or a WLAN3 interference), the communication device determines that a WLAN operates as an interference source in the frequency band similar to the WLAN frequency band.

The communication device sets the operating frequency band of the narrowband monitoring receiver to be within the WLAN frequency band, for example, an operating frequency band of a WLAN1 (e.g., the WLAN 1 interference) that may interfere with the WPAN frequency band. In this example, the newly-set operating frequency band of the narrowband monitoring receiver is not equal to the WPAN frequency band.

The communication device determines that a collision occurs between the communication device and another communication device when the narrowband monitoring receiver receives a signal having a strength or an amplitude greater than of equal to a predetermined threshold while the communication device exchanges the WPAN signal with one or more communication devices. If a narrowband interference signal is received in the operating frequency band of the narrowband monitoring receiver, a collision may be determined to occur even though interference is absent in the WPAN frequency band.

To resolve this issue, in response to the narrowband monitoring receiver receiving a signal greater than the predetermined threshold being, the communication device moves or resets the operating frequency band of the narrowband monitoring receiver to another frequency band, that is, another candidate operating frequency band within the WLAN1 frequency band. Thereafter, the communication device verifies whether further interference exists in the moved operating frequency band of the narrowband monitoring receiver, to enhance a rate of success of detecting a collision.

Figure 11:
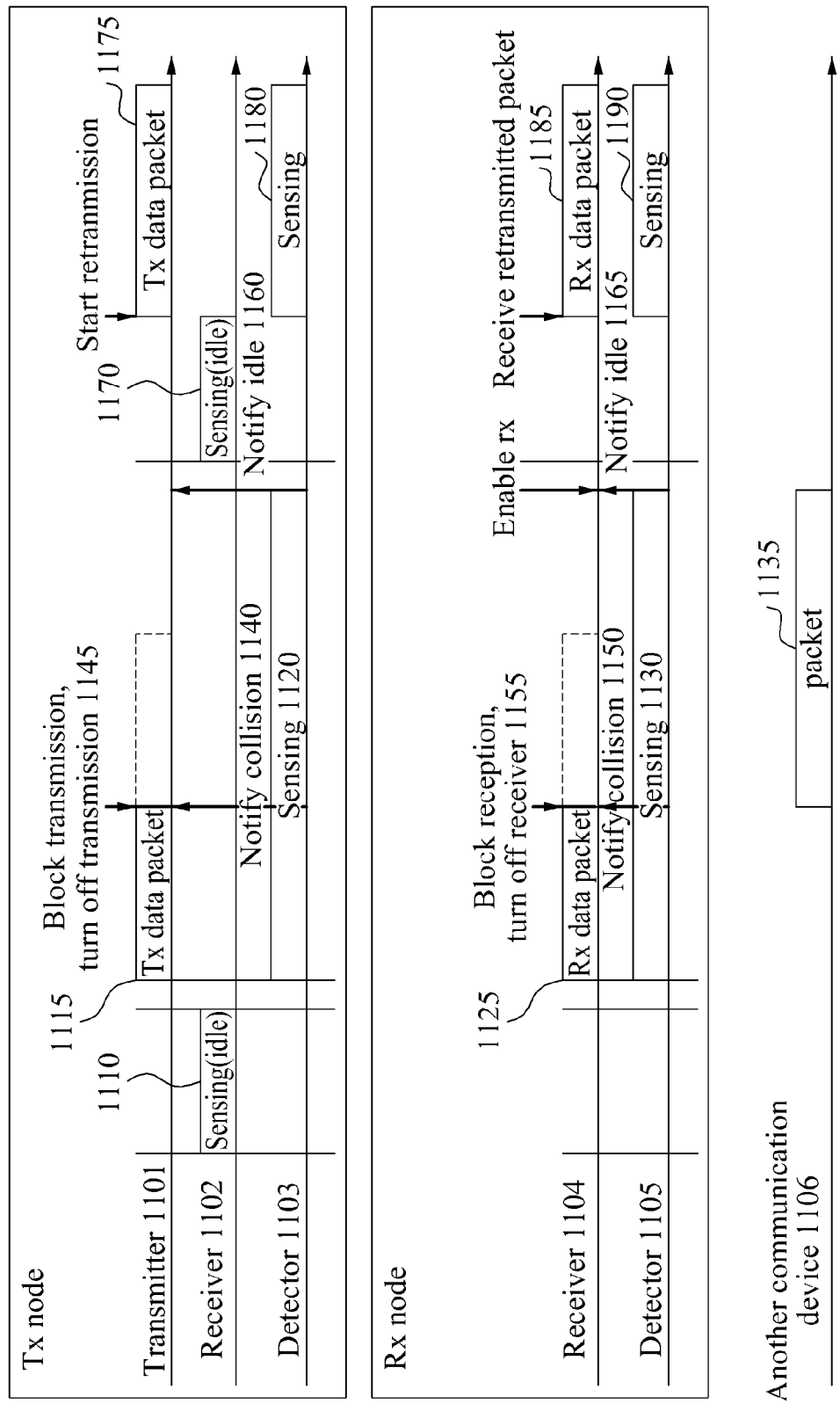
FIG. 11 is a diagram illustrating an example of a communication method when each of a transmission node and a reception node includes a detector in an environment where a WPAN signal and a WLAN signal coexist.

FIG. 11 illustrates an example of a communication method when each of a transmission node and a reception node includes a detector in an environment where a WPAN signal and a WLAN signal coexist. An operating range of a WPAN may be limited to about several meters. Thus, a WPAN communication device corresponding to the transmission node and a WPAN communication device corresponding to the reception node, may experience the same interference. That is, the transmission node and the reception node may be affected by a WLAN interference signal.

In more detail, in operation 1110, a receiver 1102 of the transmission node senses or detects whether a first frequency band, corresponding to an operating frequency band of the transmission node, is in an idle state. In operation 1115, a transmitter 1101 of the transmission node transmits a data packet using the first frequency band based on a result of the detection by the receiver 1102. In operation 1120, a detector 1103 of the transmission node senses or detects for interference in a second frequency band different from the first frequency band.

In operation 1125, the reception node provides power to a receiver 1104 of the reception node to receive the data packet. In operation 1130, the reception node provides power to a detector 1105 of the reception node to sense or detect for interference in the second frequency band.

In operation 1135, another communication device 1106 transmits another data packet while the transmitter 1101 transmits the initial data packet in operation 1115. In operation 1140, the detector 1103 notifies or informs the transmission node that a collision occurs in the second frequency band. In operation 1145, the transmission node informed by the detector 1103 that a collision occurs, causes the transmitter 1101 to block or turn off the transmission of the data packet. That is, the transmission node blocks power from being provided to the transmitter 1101.

In operation 1150, the detector 1105 detects that a collision (e.g., the interfering data packet of the other communication device 1106) occurs in the second frequency band, and notifies the reception node that the collision occurs. In operation 1155, the receiver 1104 blocks the reception of the data packet, and/or is turned off. That is, the reception node blocks power from being provided to the receiver 1104. Thereafter, the detector 1103 of the transmission node and the detector 1105 of the reception node determine whether a collision is resolved by continuously monitoring for interference in the second frequency band.

In operations 1160 and 1165, in response to the other communication device 1106 terminating the transmission of the other data packet, the detector 1103 and the detector 1105 notify or inform the transmission node and the reception node, respectively, that a collision in the second frequency band is resolved or idle. In operation 1170, the receiver 1102 senses whether the first frequency band is in the idle state.

In operation 1175, when the first frequency band is in the idle state, the transmission node causes the transmitter 1101 to start retransmission of the data packet. In operation 1180, the transmission node causes the detector 1103 to sense for interference in the second frequency band.

In operation 1185, in response to the transmission node retransmitting the data packet, the receiver 1104 receives the retransmitted data packet. In operation 1190, simultaneously, the detector 1105 senses for interference in the second frequency band. As described in the foregoing, since the transmission node and the reception node include the detector 1103 and the detector 1105, respectively, the transmission node and the reception node simultaneously detect interference. For example, any one of a wideband receiver and a narrowband receiver may be used as the detector 1103 or the detector 1105 to detect a collision.

In response to interference being detected, the transmission and reception of the data packet is ceased to reduce power consumption of the transmission node and the reception node, respectively. Thereafter, in response to a channel being in the idle state, the transmission node immediately starts retransmitting the data packet, thereby reducing a delay due to the retransmission.

Figure 12:
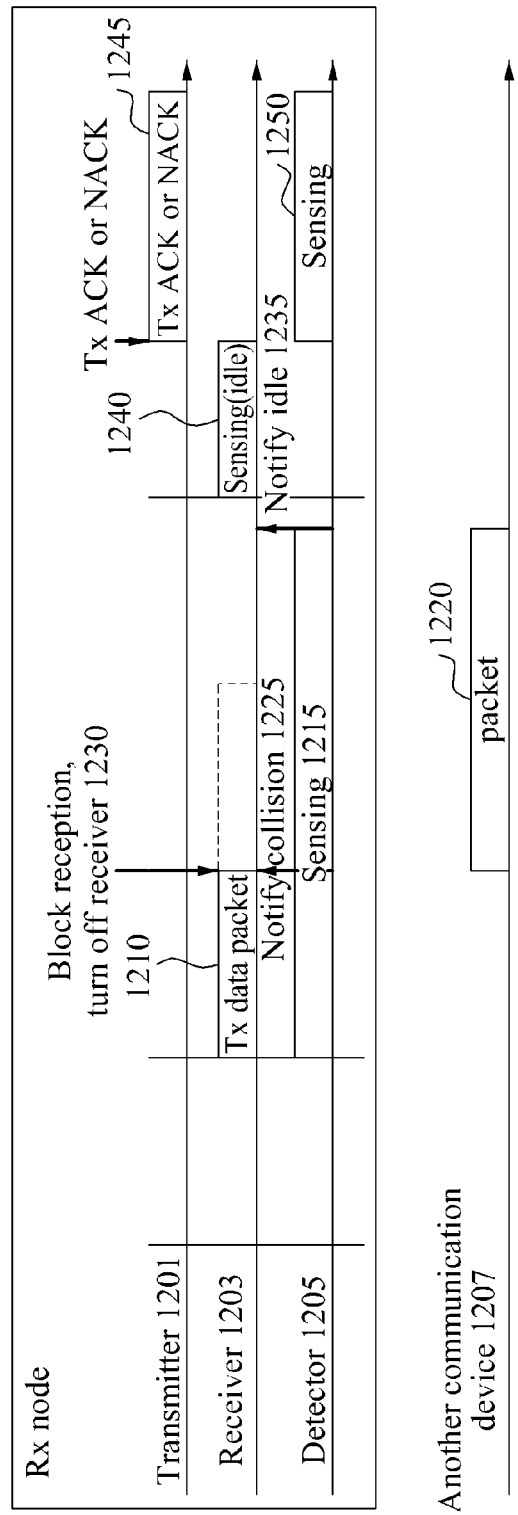
FIG. 12 is a diagram illustrating an example of a communication method when a reception node includes a detector in an environment where a WPAN signal and a WLAN signal coexist.

FIG. 12 illustrates an example of a communication method when a reception node includes a detector in an environment where a WPAN signal and a WLAN signal coexist. The communication device corresponds to a reception node, and includes a transmitter 1201, a receiver 1203, and a detector 1205. In operation 1210, in response to a communication device corresponding to a transmission node transmitting a data packet, the reception node provides power to the receiver 1203 to receive the data packet using a first frequency band. In operation 1215, the reception node provides power to the detector 1205 in conjunction with providing power to the receiver 1203, to sense or detect for interference in a second frequency band different than the first frequency band. For example, any one of a wideband receiver and a narrowband receiver may be used as the detector 1205 configured to detect a collision.

In operation 1220, another communication device 1207 transmits another data packet while the receiver 1203 receives the initial data packet in operation 1210. In operation 1225, the detector 1205 notifies or informs the reception node that a collision (e.g., the interfering data packet of the other communication device 1207) occurs in the second frequency band. In operation 1230 reception node informed by the detector 1205 that a collision occurs, causes the receiver 1203 to block reception of the data packet or to turn off. That is, the reception node blocks power from being provided to the receiver 1203, to reduce an amount of power wasted by the receiver 1203. Thereafter, the detector 1205 continuously monitors for interference in the second frequency band to determine whether the collision is resolved.

In operation 1235, in response to the collision being resolved, the detector 1205 notifies or informs the reception node that a collision in the second frequency band is resolved or idle. In operation 1240, the receiver 1203 detects whether the first frequency band is in the idle state.

In operation 1245, when the first frequency band is in the idle state, the reception node causes the transmitter 1201 to transmit an ACK message or an NACK message to the transmission node, thereby requesting a retransmission of the data packet. In operation 1250, the reception node causes the detector 1205 to sense or detect for interference in the second frequency band in conjunction with the transmission of the ACK message or the NACK message.

Depending on an Automatic Repeat Query (ARQ) operation policy or a transmission and reception procedure of a retransmission message, the transmission node may receive or may not receive the ACK message or the NACK message. Accordingly, the transmission node may transmit the ACK message or the NACK message when the reception node is capable of receiving the ACK message or the NACK message.

Descriptions with reference to FIG. 6 may be referred to for a description of when the transmission node has a function of detecting a collision. When a detector of the transmission node detects a collision while the transmission node transmits a packet, the transmission node may cease transmitting a data packet, and may later attempt a retransmission in response to the collision being resolved.

According to the teachings above, there is provided a communication device that detects a collision with a wideband communication device using an operating frequency band of the communication device in a common frequency domain, such as, for example, an ISM band. In response to the detected collision, the communication device blocks a transmission and/or a reception of a signal in advance, thereby reducing a retransmission rate and reducing power consumption of the communication device due to frequent retransmissions. The communication device attempts a retransmission of the signal if a channel is in an idle state, thereby reducing time expended for a retransmission.

The units described herein may be implemented using hardware components and software components. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a device or terminal described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a communication device, comprising:
   transmitting or receiving a packet using an operating frequency band;
   detecting whether another communication device transmits another packet using another frequency band different from the operating frequency band during the transmitting or the receiving of the packet using the operating frequency band; and
   ceasing the transmitting or the receiving of the packet using the operating frequency band based on a result of the detection.

2. The communication method of claim 1, further comprising:
   setting the operating frequency band.

3. The communication method of claim 1, wherein the ceasing comprises blocking power from being applied to the transmitting or the receiving of the packet using the operating frequency band.

4. The communication method of claim 1, wherein the detecting of whether the other communication device transmits the other packet using the other frequency band, is in conjunction with the transmitting or the receiving of the packet using the operating frequency band.

5. The communication method of claim 1, further comprising:
sensing whether the operating frequency band is in an idle state.

6. The communication method of claim 1, further comprising:
detecting whether the other communication device ceases transmitting the other packet using the other frequency band.

7. The communication method of claim 6, further comprising:
retransmitting or re-receiving the packet using the operating frequency band based on whether the other communication device ceases transmitting the other packet using the other frequency band.

8. The communication method of claim 7, wherein the retransmitting or re-receiving comprises providing power to the retransmitting or re-receiving of the packet using the operating frequency band.

9. The communication method of claim 1, wherein the detecting comprises:
detecting a strength of a signal in the other frequency band; and
detecting whether the other communication device transmits the other packet using the other frequency band based on whether the strength is greater than or equal to a predetermined threshold.

10. The communication method of claim 1, wherein the other frequency band comprises a narrow band adjacent to the operating frequency band, or a wide band comprising the operating frequency band.

11. A non-transitory computer-readable storage medium storing a program comprising instructions to cause a computer to perform the method of claim 1.

12. The communication method of claim 1, further comprising:
detecting whether a collision occurs between the communication device and the other communication device based on whether a strength of an interference signal detected in the other frequency band is greater than or equal to a predetermined threshold.

13. The communication method of claim 12, further comprising:
detecting whether the collision that occurs between the communication device and the other communication device is resolved.

14. A communication device comprising:
a transceiver configured to transmit and receive a packet using an operating frequency band;
a detector configured to detect whether another communication device transmits another packet using another frequency band different from the operating frequency band while the transceiver transmits or receives the packet using the operating frequency band; and
a controller configured to control the transceiver to cease transmitting or receiving the packet using the operating frequency band based on a result of the detection.

15. The communication device of claim 14, further comprising:
a setting unit configured to set the operating frequency band.

16. The communication device of claim 14, wherein the controller is further configured to block power from being applied to the transceiver to control the transceiver to cease transmitting or receiving the packet using the operating frequency band.

17. The communication device of claim 14, wherein the detector is further configured to detect whether the other communication device transmits the other packet using the other frequency band, in conjunction with the transceiver transmitting or receiving the packet using the operating frequency band.

18. The communication device of claim 14, further comprising:
a sensor configured to sense whether the operating frequency band is in an idle state.

19. The communication device of claim 14, wherein the detector is configured to detect whether the other communication device ceases transmitting the other packet using the other frequency band.

20. The communication device of claim 19, wherein the transceiver is further configured to retransmit or re-receive the packet using the operating frequency band based on whether the other communication device ceases transmitting the other packet using the other frequency band.

21. The communication device of claim 20, wherein the controller is further configured to provide power to the transceiver to control the transceiver to retransmit or re-receive the packet using the operating frequency band.

22. The communication device of claim 14, wherein the detector is further configured to:
detect a strength of a signal in the other frequency band; and
detect whether the other communication device transmits the other packet using the other frequency band based on whether the strength is greater than or equal to a predetermined threshold.

* * * * *